Oct. 10, 1961
L. RUSSELL
3,004,154
PHASE WOBBLER
Filed Oct. 18, 1957
3 Sheets-Sheet 1
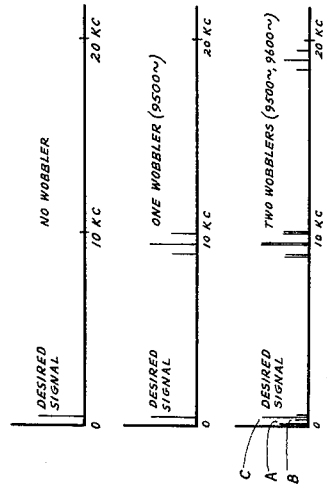
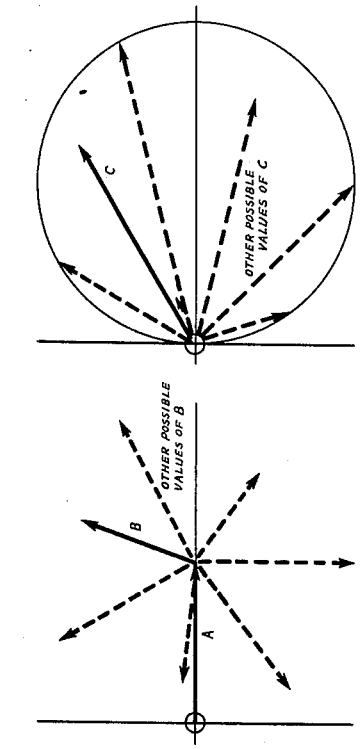
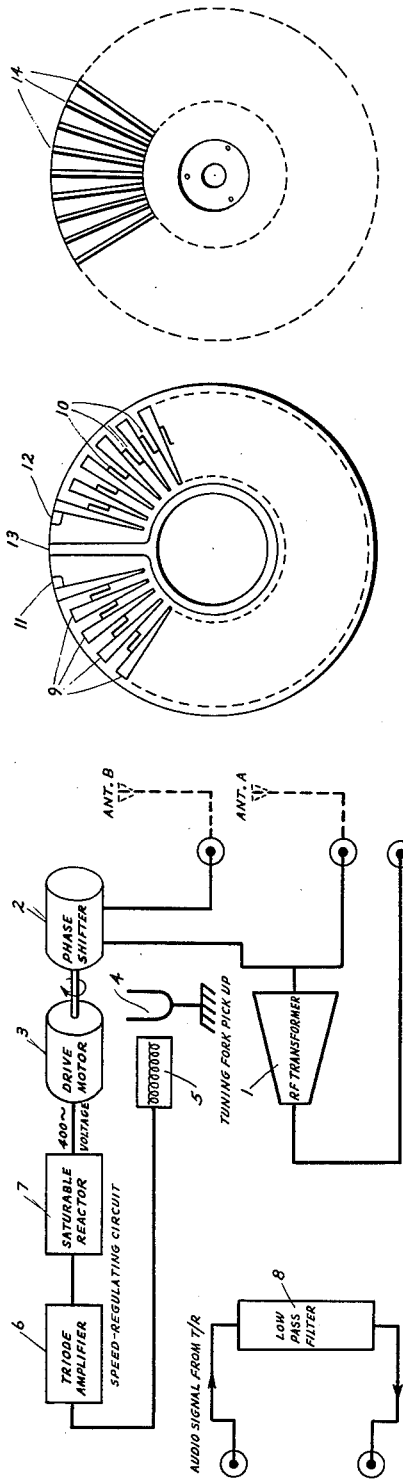
INVENTOR.
Lindsay Russell
BY Ezekiel Wolf
Attorney

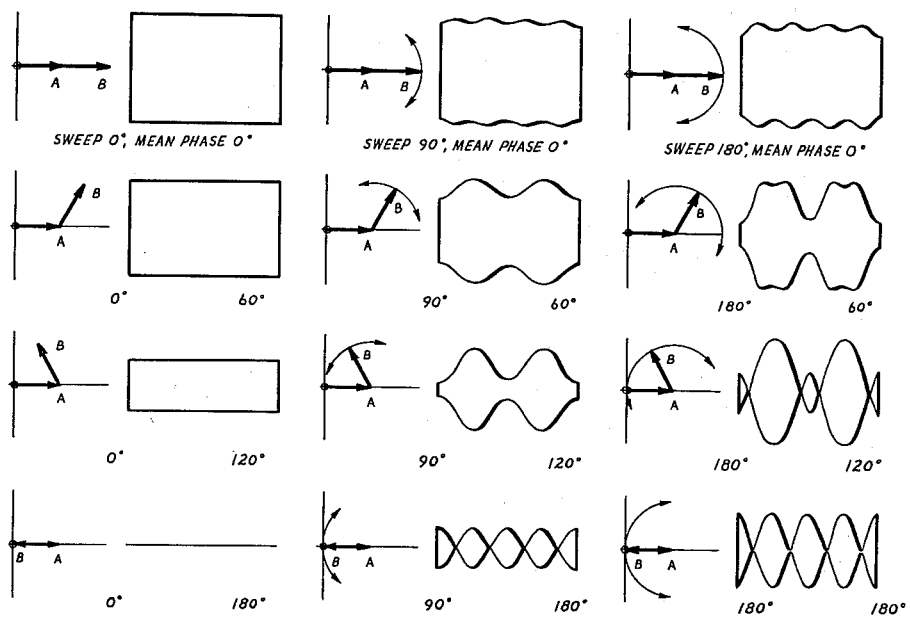
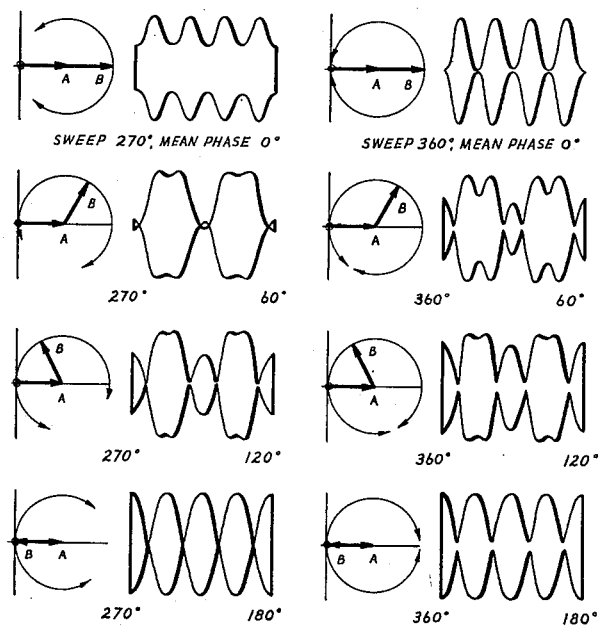
FIG. 2

Oct. 10, 1961        L. RUSSELL              3,004,154
                   PHASE WOBBLER
Filed Oct. 18, 1957                      3 Sheets-Sheet 3
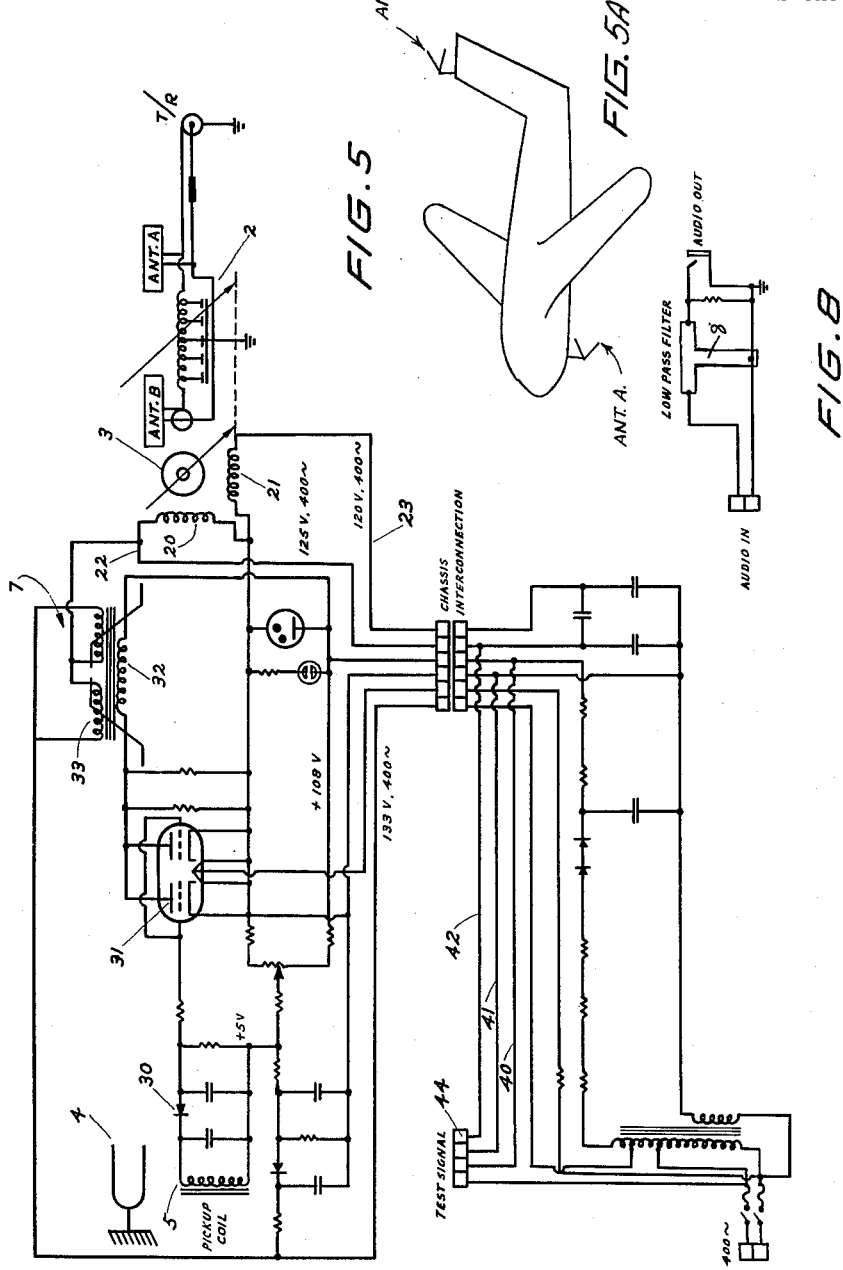
INVENTOR.
Lindsay Russell.
BY
Ezekiel Wolf
Attorney

United States Patent Office 3,004,154
Patented Oct. 10, 1961

3,004,154
PHASE WOBBLER
Lindsay Russell, Needham, Mass., assignor to
Andrew Alford, Boston, Mass.
Filed Oct. 18, 1957, Ser. No. 690,969
10 Claims. (Cl. 250—17)

The present invention relates to a means for improved communications between stations moving relative one to another and in particular to improved UHF aircraft communications.

There is a greater reliance in aircraft communications, and particularly military aircraft communications on the UHF band. This band has several inherent problems in its use, principal among which is the non-uniform radiation of signals on a UHF antenna.

It is not possible to locate the UHF command radio antenna on certain present-day aircraft in such a position that it will radiate signals of sufficient strength in all desired directions from the aircraft. There will generally be nulls or shadows in some directions, making it necessary, at times, to change course in flight in order to carry on UHF communication.

The use of two UHF antennas, located on different parts of the aircraft, will result in an improvement in this respect, since one antenna can usually cover directions that the other cannot, and if they are properly placed on the aircraft, it is possible, between the two of them, to radiate a reasonably strong signal in any direction.

If the two antennas were simply connected in parallel there would be directions in which the signals from each would be about equal in strength and opposite in phase. They would then cancel each other and so create an interference null in that direction. Because of these interference nulls (there might be six or eight of them or more) UHF performance with two parallel-fed antennas would probably be no better than with one alone, possibly worse in fact.

The purpose of the present invention is to permit the use of two antennas by continually varying the phase of one of them back and forth about a mean value so as to eliminate stationary interference nulls. The essential part of the wobbler of the present invention is a high speed mechanical phase-shifter which varies or "wobbles" the phase of the R.F. signal sent through it at a rate of about 9600 cycles per second. The pattern of the antenna system, then, will have interference nulls in it at any one instant but the phase wobbling will cause the null directions to keep changing so that any given direction will receive signal at least part of the time.

If the aircraft transmitter is putting out a steady carrier, the signal received on the ground will generally have an effective modulation on it of a 9600 cycle tone because of the wobbling (if the wobbling is at a 9600 cycle per second rate). If the transmitter is voice-modulated the normal modulation will appear in addition to the tone.

Because this 9600 cycles is well above the highest audio frequency that must be transmitted for intelligible speech, the tone can be removed by filtering the receiver output, without any particular loss to speech quality. A low-pass audio filter (8000 cycle cut-off), for example, may be included in the wobbler unit for this purpose.

When two wobbler-equipped aircraft communicate with one another a beat tone can be imparted to the signal, appearing as a modulation of the UHF carrier at a frequency equal to the difference between the two wobbling rates. Thus, if one wobbler operates at 9600 cycles and the other at 9500, a 100 cycle tone will be present in the received signal. The wobbler uses a two-phase induction motor to drive the phase shifter; its speed of rotation, which determines the wobbling rate, depends on the voltage fed to it, frequency, stiffness of grease in its bearings, etc. It is necessary that the above-mentioned beat tone be kept low in pitch in order that it not be objectionable to the listener; accordingly an electronic governor or speed regulator must be included in the wobbler to hold the motor speed constant to within 0.9% or so of the correct preferred value (e.g. 120 rev./sec.). This keeps the wobbling rate between the limits of about 9520 to 9680 cycles per second when the preferred rate is 9600 cycles per second.

These and other features, objects, advantages and constructional details will be more clearly understood when considered in connection with the accompanying drawings in which FIGURES 1 and 1A are illustrative schematic diagrams showing vector relationships of signals derived from a dual antenna.

FIGURE 2 is an illustrative graphic series of the vectors A and B having different relative mean phase values and different arcs of sweep over which the signal wobbles. In this figure the absolute values of signals represented by vectors A and B are assumed equal.

FIGURE 3 is an illustrative graph used in the explanation of the effect of wobbler modulation on the "intelligence" signal when wobblers are used at both the transmitter and receiver.

FIGURE 4 is a block diagram of the invention.

FIGURE 5 is a schematic diagram of the invention.

FIGURE 5A shows an aircraft carrying one antenna on its tail and a second antenna under its belly.

FIGURES 6 and 7 are plan views of the faces of the stator and rotor respectively, and FIGURE 8 is a schematic diagram of the connection between audio input and output.

The effects of wobbling in terms of vector relationships will be explained with the aid of FIGURE 1. The signal presented to the receiver of a wobbler-equipped aircraft will be the vector sum of the contributions of the two antennas involved. These vectors, denoted as A and B in FIGURE 1, may have any arbitrary phase difference and amplitude ratio.

If A, the stronger of the two, is considered as fixed and given the position shown, the resultant or sum vector C will run from the origin to some point within the circle indicated. The purpose of phase wobbling is to prevent the loss of communication that can occur if vector C is very small due to near equality of amplitude and opposition of phase of vectors A and B, the dotted lines in FIGURE 1A indicating vector C.

If the signals are varied in phase sinusoidally, the effective amplitude modulation is dependent upon the phase sweep or wobbling and the mean phase of one signal relative to the other. A graphic illustration of this is shown in FIGURE 2, where the plot is based upon equal amplitudes for vectors A and B representing signals from each antenna. Where the signals are equal, as illustrated, the worst case as far as depth of modulation introduced by wobbling is presented.

If the amount of wobbling is small, 90° or less peak-to-peak phase shift, the average value of vector C depends strongly on the mean phase difference between A and B so that as the aircraft maneuvered we might expect considerable rise and fall of signal.

On the other hand, with phase shifting of 200° or more, the average value of resultant signal C becomes more or less independent of the mean phase difference between A and B so that the wobbler could then be said to be doing its job effectively. The optimum phase shift appears to be 270° peak-to-peak; this value results in there being almost no dependence of RMS signal level of vector C on the mean phase difference of A and B.

The resultant signal, vector C, is both amplitude and phase modulated by the wobbling process; it is believed likely that the phase modulation has little ultimate effect, although this is not certain. The amplitude modulation can be very strong and, as can be seen from FIGURE 2, the apparent modulating signal will often be rich in harmonics of the fundamental 9600 cycle wobbling frequency.

A factor of obvious importance is the signal loss introduced by the use of a wobbler in the UHF system. The loss comes about in two ways.

There is a true power loss in the wobbler amounting to about 1.5 db. In addition, the use of a dual antenna system may require a fairly long cable run to at least one of the antennas, with a consequent additional power loss.

There may be an effective power loss because some of the RF energy after wobbling will be in the form of sidebands due to the secondary modulation; these sidebands will not necessarily contribute in a useful way to the final detected signal.

This latter factor may be termed the secondary modulation loss. Its seriousness will depend on the nature of the receiver, especially the detector. Measurements performed indicate that the secondary modulation loss can range from 0 to 2.5 db, depending on the degree of amplitude modulation imparted to the signal by the wobbler. These measurements were made by determining the additional transmitter power needed to maintain a given signal-to-noise ratio at the receiver under the condition of deep wobbler modulation.

The factors which determine the depth and wave-shape of wobbler modulation include the mean phase difference and relative levels of the signals from the two antennas, and these factors in turn depend on the aircraft's position relative to other station. Thus the secondary modulation loss will be different directions from the aircraft. A value of 1.5 db is estimated to be the average amount of loss due to this effect.

The total effective loss resulting from the use of a wobbler and dual antenna system normally is in the range 2.0 to 5.0 db.

When two wobbler-equipped aircraft communicates with one another the RF signal undergoes wobbler modulation twice, once at each aircraft, which effect can result in a beat tone's being imparted to the signal as mentioned previously. This effect is better understood from considering the resulting spectral distribution illustrated in FIGURE 3. The "intelligence" or initial modulating signal is a 500 cycle tone in this example, and the intermodulation products due to wobbling are shown for both the one-wobbler and two-wobbler cases.

These spectra represent the audio output of the receiver when the 500 cycle tone is modulating the carrier 100% and when the effect of the wobblers is to amplitude modulate the RF signal 100% simultaneously at respective rates of 9500 and 9600 cycles per second.

The spurious components above 8000 cycles can be filtered out so that they need not be discussed. Those which are denoted as A, B and C fall within the speech spectrum (roughly 100–5000 c.p.s.) and cannot be removed without loss to speech quality. These three components represent a 100 cycle modulation of the original signal or, in other words, a low frequency flutter not unlike that which is encountered in air-to-air communication when there are multiple paths.

Experiments performed with various receivers indicate that this flutter will not seriously impair speech intelligibility when these two conditions are met—(1) when the frequency is below 180 cycles per second, and (2) when the depth of flutter modulation is not more than about 50%.

The first can be met by the use of a speed regulator on the wobbler; the second condition is almost always met because of the characteristics of the wobbler modulation. (It would not be met if square wave instead of sine wave modulation resulted from wobbling.)

What this means is that two stations whose wobblers are so regulated as to run between, say 9520 and 9680 c.p.s., can communicate with one another without any particular difficulty.

The overall construction of the present invention may best be understood by considering the schematic block diagram of FIGURE 4 and then a specific embodiment as illustrated in FIGURE 5.

Antennas A and B suitably located on an airplane as, for example, one on the tail and the other on the belly as shown in FIGURE 5A, are connected in parallel to an RF transformer, with one (antenna B) being connected through the phase shifter 2. The transformer 1 steps up the impedance of the parallel connection to the impedance of the individual antenna for connection to a transmitter receiver.

The phase shifter 2 is operatively controlled for shifting phase at a selected rate, preferably about 9600 cycles/second over a selected sweep preferably about 270° by the drive motor 3. The motor 3 in turn is maintained at a constant speed to avoid effects of a beat tone when two wobblers are used by a speed regulating circuit. In this operation a tuning fork 4 is mounted adjacent the rotor of the motor 3 which carries a small permanent magnet. After the voltage to the motor and through the regulator circuit builds up to a specified value, as, for example, 165 volts, the magnet causes the fork to vibrate at about 120 rev./sec. This in turn induces a voltage in the pickup coil 5 mounted nearby. This voltage then acts through the triode amplifier 6 and saturable reactor 7 to regulate the motor voltage thereby mainaining the motor r.p.m. A low pass filter 8 is provided between the audio input and output of the receiver to filtrate frequencies over approximately 8000 cycles generated by the wobbler. The phase shifter proper consists of a stator and rotor shown respectively in FIGURES 6 and 7. The stator is a plastic annular disk preferably made of Teflon or similar material. The face is printed by conventional techniques with a series of radially spaced triangular shaped conductive plates 9 connected in series by line segments 10 with the major portion of each line segment arranged radially. Terminals 11, 12 are provided on the stator for connections to the antennas, while terminal 13 is a ground terminal.

The rotor axially mounted on the shaft of the drive motor 3 is preferably formed of aluminum and acts as a ground sheet. This rotor is provided with the successive radial slots 14 in its face.

The stator and rotor are mounted parallel to one another with an air gap of about .010 inch between them to effectively form a strip transmission line. The RF signal fed to one antenna flows through the printed circuit; the spinning rotor causes the phase shift it undergoes to vary 80 times per rotor revolution. (There are 80 slots in the face of the rotor.) The phase shift is greatest when the rotor wedges are directly above the wide tabs of the stator circuit.

The amount of phase variation increases as the air gap between rotor and stator is made smaller. Warping of the stator plastic is a limiting factor in this respect since it makes it difficult to maintain a normally small gap throughout the printed circuit area. It is preferable that the stator's outer edge, as well as its inner edge, be clamped which thereby makes a somewhat smaller gap practicable with a resultant increase in phase variation.

Preferably 50 ohm feeds are used from the antennas, which being connected in parallel have an impedance at this function of 25 ohms. The broad band 2:1 RF transformer accomplishes this. Preferably this transformer is in the nature of a sandwich transmission line and makes use of two quarter wave sections.

The motor carrying the rotor may be a 7 watt, 2 phase, 400 cycle induction servo motor. In the particular model under consideration the motor has two stator windings 20, 21 which must receive about 100 to 130 volts at 400 cycles with the two voltages 90° out of phase. This is obtained by connecting the coils in parallel to the common with power to their other terminals supplied through the lines 22, 23, the voltage through one of these lines being delayed 90.

In the operation of the speed regulator circuit, the tuning fork induced voltage in the coil 5 is rectified by the rectifier 30 and fed as a negative D.C. signal to the grid of the triode tube 31. As this grid signal increases the triode's plate current decreases. The D.C. coil 32 of the saturable reactor is connected in series with the plate of the triode, and the A.C. coil 33 of the saturable reactor is connected in series with the stator windings 20, 21. As the triode plate current decreases there is an induced increased reactance in one A.C. coil 33 which consequently causes a drop in the voltage fed to the motor.

If desired provisions may be provided for field testing the unit for proper operation by measurement of plate line, and motor voltage. For this purpose lines 40, 41, 42, respectively, are provided with connections to a test circuit terminal 44.

I claim:

1. In an RF transmitting system apparatus aboard a vehicle comprising, two spaced antennas on said vehicle, a source of high frequency energy modulated with an intelligence signal having its spectral components below a predetermined audio frequency, means coupling said source to said antennas, the latter coupling means including a phase shifter coupled to one of said antennas for varying the phase of its carrier signal relative to the signal in the other antenna at a frequency greater than said predetermined audio frequency and substantially less than the carrier frequency to radiate said energy in all directions.

2. In an RF transmitting system apparatus aboard a vehicle comprising, two spaced antennas for radiating at physically spaced positions on said vehicle, a source of high frequency energy modulated with an intelligence signal having its spectral components below a predetermined audio frequency, means coupling said source to said antennas, the latter coupling means including a phase shifter coupled to one of said antennas for varying the phases of its carrier frequency at a frequency greater than said predetermined audio frequency and substantially in excess of the frequency of the intelligence signal transmitted to radiate said energy in all directions.

3. In an RF transmitting system apparatus aboard a vehicle comprising two spaced antennas for radiating at physically spaced positions on said vehicle, a source of high frequency energy modulated with an intelligence signal having its spectral components below a predetermined audio frequency, means coupling said source to said antennas, the latter coupling means including a phase shifter coupled to one of said antennas, a motor for operating said phase shifter to vary the carrier frequency in one antenna relative to the other at a frequency rate substantially in excess of said predetermined audio frequency to radiate energy of said carrier frequency modulated with said intelligence signal in all directions, and means for operating said motor at a substantially constant rotational velocity.

4. In an RF transmitting system apparatus aboard a vehicle comprising, two spaced antennas for radiating at physically spaced positions on said vehicle, a source of high frequency energy modulated with an intelligence signal having its spectral components below a predetermined audio frequency, means coupling said source to said antennas, the latter coupling means including a phase shifter coupled to one of said antennas, said phase shifter adapted to sweep the phase of the carrier frequency in one antenna relative to the other over a range of substantially 270° to radiate said modulated high frequency energy in all directions, and means for operating said phase shifter at a frequency rate substantially in excess of said predetermined audio frequency.

5. A device as set forth in claim 4 wherein means are provided for operating said motor at a constant rate.

6. In an RF transmitting system utilizing two spaced antennas for radiating at physically spaced positions common carrier and modulating frequencies, means for eliminating stationary interference nulls comprising, means coupling said antennas to a signal transducer, a phase shifter coupled to one of said antennas for varying the phases of its carrier frequency at a frequency rate substantially in excess of the frequency of the intelligence signal transmitted, said phase shifter comprising, a disk shaped rotor parallelly facing a closely adjacent disk shaped stator, said rotor being of conductive material with a plurality of radially arranged slots in its surface facing said stator, said stator being of dielectric material with a plurality of radially arranged wedge shaped conductive plates conductively interconnected in series on the surface facing said rotor, thereby forming a strip transmission line.

7. Communication apparatus aboard a vehicle comprising, a source of high frequency energy modulated with an intelligence signal having its spectral components below a predetermined audio frequency, a pair of antennas located at different points on said vehicle, means for coupling said modulated high frequency energy source to said antennas, said coupling means including means for periodically varying at a substantially constant rate greater than said predetermined audio frequency the relative phase between energy delivered to said antennas over a range of at least 200 electrical degrees to provide omnidirectional radiation therefrom.

8. Communication apparatus in accordance with claim 7 wherein said range is substantially 270 electrical degrees.

9. Communication apparatus aboard a vehicle comprising, a source of high frequency energy modulated with an intelligence signal having its spectral components below a predetermined audio frequency, a pair of antennas located at different points on said vehicle, means for coupling said modulated high frequency energy source to said antennas, said coupling means including means for sinusoidally varying at a substantially constant rate greater than said predetermined audio frequency the relative phase between energy delivered to said antennas to provide omnidirectional radiation therefrom.

10. A communications system for exchanging information over a high frequency carrier comprising, two spaced antennas which have at least one null in their common radiation pattern when coupled together solely by means having a linear transfer characteristic, a junction, means coupled to and exchanging modulated high frequency energy with said junction, said modulated high frequency energy including spectral components within a band of frequencies centered about a high carrier frequency, the width of said band being small compared to said high carrier frequency, at least one continuous range of said band including spectral components of a substantially undistorted intelligence signal, means for establishing separate wave transmission paths between said junction and each of said antennas, and means for cyclically varying the relative phase between said modulated high frequency energy transmitted over one of said paths over a continuous range at a rate which is outside a range of rates corresponding to the difference between said high carrier frequency and the limit frequencies of said one continuous range to exclude spectral components due to said cyclical phase variations from said continuous range while exchanging said intelligence signal with an external station independently of the direction of said external station with respect to said system.

References Cited in the file of this patent

UNITED STATES PATENTS 1,819,589    Beverage _____ Aug. 18, 1931

(Other references on following page)

UNITED STATES PATENTS

| | | |
|---|---|---|
| 1,877,858 | Hahnemann | Sept. 20, 1932 |
| 1,917,295 | Dreyer | July 11, 1933 |
| 2,403,500 | Carlsen | July 9, 1946 |
| 2,413,396 | Weagant | Dec. 31, 1946 |
| 2,416,336 | Marchand | Feb. 25, 1947 |
| 2,425,303 | Carter | Aug. 12, 1947 |
| 2,640,192 | Marchand | May 26, 1953 |
| 2,674,729 | Carter | Apr. 6, 1954 |
| 2,770,802 | Mullaney | Nov. 13, 1956 |